United States Patent
Bullerdick et al.

(10) Patent No.: US 10,219,511 B2
(45) Date of Patent: Mar. 5, 2019

(54) SUBMERSIBLE DECOY DUNKING APPARATUS

(71) Applicants: Chris A. Bullerdick, Providence, KY (US); Brett M. Jones, Hanson, KY (US)

(72) Inventors: Chris A. Bullerdick, Providence, KY (US); Brett M. Jones, Hanson, KY (US)

( * ) Notice: Subject to any disclaimer, the term of this patent is extended or adjusted under 35 U.S.C. 154(b) by 316 days.

(21) Appl. No.: 15/330,518

(22) Filed: Sep. 30, 2016

(65) Prior Publication Data

US 2017/0099831 A1    Apr. 13, 2017

Related U.S. Application Data

(60) Provisional application No. 62/284,447, filed on Sep. 30, 2015.

(51) Int. Cl.
*A01M 31/06* (2006.01)
*A01M 99/00* (2006.01)

(52) U.S. Cl.
CPC ............ *A01M 31/06* (2013.01); *A01M 99/00* (2013.01)

(58) Field of Classification Search
CPC .............................. A01M 31/06; A01M 99/00
See application file for complete search history.

(56) References Cited

U.S. PATENT DOCUMENTS

| | | |
|---|---|---|
| 2,547,286 A | 4/1951 | Sabin |
| 2,624,144 A * | 1/1953 | Beverman ............. A01M 31/06 43/3 |
| 2,726,469 A | 12/1955 | Becker |
| 4,422,257 A | 12/1983 | McCrory |
| 4,535,560 A | 8/1985 | O'Neil |
| 4,910,905 A | 3/1990 | Girdley et al. |
| 5,074,071 A * | 12/1991 | Dunne .................. A01M 31/06 43/2 |
| 6,079,140 A * | 6/2000 | Brock, IV ............. A01M 31/06 43/3 |
| 6,092,323 A | 7/2000 | McBride et al. |
| 6,138,396 A | 10/2000 | Capps |
| 6,442,885 B1 | 9/2002 | Payne |
| 6,625,919 B1 | 9/2003 | Davis et al. |
| 6,845,586 B1 | 1/2005 | Brock |
| 7,043,865 B1 * | 5/2006 | Crowe .................. A01M 31/04 43/3 |
| 7,788,840 B2 | 9/2010 | Wyant et al. |
| 8,950,103 B2 | 2/2015 | Bullerdick et al. |
| 2002/0124453 A1 | 9/2002 | Payne |
| 2003/0024146 A1 | 2/2003 | Spady et al. |
| 2006/0143968 A1 | 7/2006 | Brint et al. |
| 2009/0094877 A1 | 4/2009 | Smith |
| 2013/0014422 A1 * | 1/2013 | Bullerdick ............ A01M 31/06 43/3 |

(Continued)

*Primary Examiner* — Christopher P Ellis

(74) *Attorney, Agent, or Firm* — Carrithers Law Office, PLLC

(57) ABSTRACT

A decoy collapsible base and frame that floats just below the surface of a body of water. A plurality of fowl shaped bodies defining duck decoys that float are detachably connected to the frame by tether lines. The tether lines are connected to a cam and a tether anchor moveably mounted on the frame. Rotation of the pitman connecting to the tether lines pivots opposing duck decoys resulting in a dunking motion of selectively positioned duck decoys

20 Claims, 8 Drawing Sheets

(56) References Cited

U.S. PATENT DOCUMENTS

| | | | |
|---|---|---|---|
| 2013/0212924 A1* | 8/2013 | Shisko | A01M 31/06 43/2 |
| 2016/0174541 A1* | 6/2016 | Goodman | A01M 31/06 43/3 |
| 2017/0118978 A1* | 5/2017 | Denson | A01M 31/06 |

* cited by examiner

SUBMERSIBLE DECOY DUNKING APPARATUS

TECHNICAL FIELD

The present invention relates generally to decoys used to attract game waterfowl and more particularly a decoy support frame with selected floating characteristics and means for anchoring multiple fowl shaped decoy bodies to the frame in spaced apart relation and to a decoy having a submersible frame and motor and control assembly with a plurality of floating objects tethered to a submersible frame by tether lines.

BACKGROUND OF THE INVENTION

Decoys are used by hunters to attract waterfowl, such as ducks, in an attempt to bring them into shotgun shooting range. Decoys commonly employed are single fowl shaped bodies that float and usually tethered to stay in a general location.

Applicant's prior U.S. Pat. No. 8,950,103 teaches a dunking decoy apparatus comprising a frame including an upper frame portion extending above a surface of a body of water and a lower frame portion extending below the surface of the body of water. The frame includes at least two opposing arms extending outwardly from a base of the lower frame portion. Float means such as an inner tube or air filled tire or bladder on the frame supports the base causes at least a portion of it to float in the body of water at a selected depth. An anchor extends from the frame below the base and attaches to the frame by a line at a selected position. The anchor rests on the bottom surface of the body of water and holds the frame at a selected stationary position in the water. An electric motor supported on the frame at a selected position above the surface of the body of water includes a shaft extending from the motor in cooperative engagement with a pitman arm rotatably connecting thereto. A pitman connects to the pitman arm in rotational communication with the pitman arm and the motor. A tether line attaches to a selected attachment point of the pitman extending along each one of the at least two arms extending from the frame. A tether line guide means extends from each one of the at least two arms. Means for movably mounting the tether line pitman on the frame provides movement along a predetermined path. At least one floatable first decoy and a floatable second decoy attaches to a distal end of each opposing tether line. The rotation of the pitman arm in a circulation motion creates a cam action decreasing and increasing the length of the tether line causing at least a portion of the floatable first decoy to be submerged and simultaneously increasing the length of the opposing tether line causing at least a portion of the floatable second decoy to surface. The present invention provides for an improved decoy with a submerged drive unit which makes the frame and motor assembly completely submergible.

U.S. Pat. No. 4,422,257 uses a carousel structure mounted above the water than can be seen by approaching game and creates an obstacle for ducks. U.S. Pat. No. 4,535,560 uses a complex underwater structure requiring multiple anchors and a remote power source requiring underwater installation. U.S. Pat. No. 6,625,919 teaches a decoy connected to a pivotally mounted transport arm and moving of the transport arm an decoy mounted thereon to a position along an arc between proximal and distal locations relative to the surface of the water. U.S. Patent Publication 20060143968 teaches a device for rotation of a decoy.

U.S. Pat. No. 6,845,586 teaches the use of a submersible frame and motor assembly for imparting motion to decoys using leads extending to decoys on the surface. U.S. Patent Publication 20030024146 teaches a plurality of decoys mounted on a frame extending from a central point. U.S. Pat. No. 6,442,885 teaches the use of a shaft having a plurality of arms and outer bearing tube rotatably attached to each arm at selected intervals and depths whereby rotation of a shaft results in movement of the decoys. U.S. Pat. No. 7,788,840 teaches an apparatus including a rotating support rod including pivoting decoy supports extending from a base suspended by a tether to an anchor. U.S. Pat. No. 7,043,865 teaches a floating decoy apparatus utilizing a rotating frame suspended at a selected depth by an anchor and including a powered movable decoy extending from an elevated central frame member.

U.S. Pat. No. 6,079,140 to Brock discloses a motion system so for decoys comprising a frame suspended beneath the surface. The frame is suspended from a plurality of floating decoys by a guide wire or string, one end of which is tied to the front of each decoy and the other of which is tied to the frame. Also attached to the frame is a vertically mounted motor with the propeller oriented towards and parallel with the water surface. When activated, the motor drives the frame in a downward direction, thereby dragging the front portion of the decoys beneath the water surface to simulate a waterfowl in the feeding position. The principal disadvantage of Brock is that the device operates using an underwater motor. Under-water motors such as those used in Yerger and Brock are expensive to purchase and require routine maintenance due to the corrosion caused by long periods of submersion. Additionally, the Brock device is not capable of maintaining a continuous splashing and rippling action on the surface of the water, because once the Brock motor is activated, the frame is pushed away from the water surface and down towards the bottom of the water body. Furthermore, the character and amount of ripples and splashing cannot be controlled using the Brock device because it is difficult to alter the distance between the underwater motor and the water surface once the decoy system is deployed.

None of the prior art references provide a method which utilizes a cam mechanism to alternately dunk opposing duck decoys extending from arms or arms attached to a central frame and drive unit assembly can be completely submerged as described and claimed in the instant invention.

SUMMARY OF THE INVENTION

The present invention includes improvements to applicants' prior U.S. Pat. No. 8,950,103 for a DECOY DUNKING APPARATUS which issued on Feb. 10, 2015 and which is incorporated by reference herein in it's entirety.

The present invention provides for a dunking decoy apparatus consisting essentially of a frame including at least two opposing arms extending outwardly therefrom. Means on the frame are provided for causing the same to float in a body of water. A tether line anchor means is included which comprises a pitman extending from a pitman arm connected to a shaft extending from the motor supported on the frame. A tether line extending from the folding arms which extend from the frame engages guide means extending along the arms from the pitman. The means for cooperatively and rotatably moving the pitman include means defining pitman arms movably mounting the pitman with respect to the frame for movement along a predetermined path. Means connect an end of the individual tether lines to the pitman.

Pulley means spaced apart from the pitman connect a decoy at a selected position for pivoting the decoy capable of floating in a body of water. Rotation of the pitman along the predetermined path shortens a tether line extending along a selected arm causing the decoy to pivot downward and simultaneously lengthens a tether line extending along the opposing arm releasing tension thereof and causing the decoy to pivot upward.

The prior art decoy apparatus features a floatation means for holding the base, planar box, control box with battery and motor out of the water and included tether lines capable of being connected at one end thereof to game bird simulating bodies able to float in a body of water. An anchoring means such as a stake or heavy object such as an anchor was needed and/or desired to retain the decoy apparatus in a predetermined floating location in a body of water to prevent drift from wind or waves. The present improved decoy apparatus includes a submersible power unit with a motor and battery in order that the entire frame may be submerged resisting draft and detection by game birds.

There is also provided in accordance with the present invention a game bird decoy comprising a frame including means causing the same to float in a body of water, a plurality of fowl shaped bodies each capable of floating on the surface of a body of water, individual tether lines connected at one end thereof to a respective one of the fowl shaped bodies and at the other end to a tether line anchor, and means mounting the tether line anchor on the frame for movement along a predetermined path.

More particularly, the present invention provides for a decoy apparatus providing pivotal and rotating movement of a floating game bird decoy mounted to a frame connected to an individual tether line movably secured to a frame engaging guide means such as a loop or an eyelet affixed to selected locations on the frame. A cam mechanism defining a pitman movably mounts the tether line to the frame for movement along a predetermined path. The decoy frame defines a base which includes spaced apart attachment points for connecting the tether lines thereto to allow selection of an optimum pivot connection point. The decoys are spaced apart from one another by the frame arms. The decoy apparatus frame includes a central stationary portion or base having a plurality of arms with means for pivotally attaching the arms to the central stationary portion. The arms are foldable and move from a decoy storage position to a operative position wherein they radiate outwardly to extend radially from the base. The arms can be locked into position by holding means such as clips or pins. Moreover, the arms are adjustably variable in length either telescoping or by the insertion of cooperatively engaging extensions. Furthermore, the tether line anchor of the decoy frame moves in a closed loop path extending from the decoys along the arms to the cam. The present invention is designed for motor housing extending from the frame base to rest on the bottom of a body of water supporting the central portion of the frame with the arms extending outward therefrom either resting on the bottom or suspended outwardly from the frame base and submerged in the water. Only the decoys float on the surface. A remote control cable may extend from the submerged motor to a hand held unit of a user; or a receiver may be mounted onto an optional central decoy support member or mast which extends out of the water or is telescoping and extendable out of the water, wherein a remote control unit can be used to send a signal to the receiver in electrical communication with the motor to control the motor providing power to turn the cam and rotate the arms and decoys and pivoting of the decoys.

A principal object is to provide a frame to which multiple floating fowl shaped objects can be anchored and maintained in spaced apart floating relation.

Another object of the present invention is to provide a submersible frame and a submersed waterproof motor and drive unit cannister attached to the bottom of the frame base for submersing in a body of water.

A further object is to provide a decoy collapsible frame with fowl shaped bodies detachably connected thereto in predetermined spaced apart relation.

A still further object is to provide the foregoing decoy with means for controllably moving the floating fowl shaped bodies.

Still another object is to provide an optional top mast extending above the water for supporting a decoy which is further animated by mechanical means.

Another object of the invention is to connect radially extending arms to a motor rotating a cam mechanism connecting to tether lines of floating decoys to pivot the decoys simultaneously with the rotation of the arms so opposing decoys move in opposite up and down directions.

Another object of the present invention is to provide a tether line attaching decoys to a cam on the decoy frame which moves in a closed loop path extending from the decoys along the arms to the cam so that opposing decoys are in various positions of floating on the water, dunking with the decoy's head under water at a 90 degree angle with respect to the water surface, swimming due to rotation of the arms, and tipping whereby the head of the decoy is angled from 0 to 90 degrees with respect to the water depending upon the position of the cam.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DETAILED DESCRIPTION OF THE PRIOR ART EMBODIMENT

Figure 1:
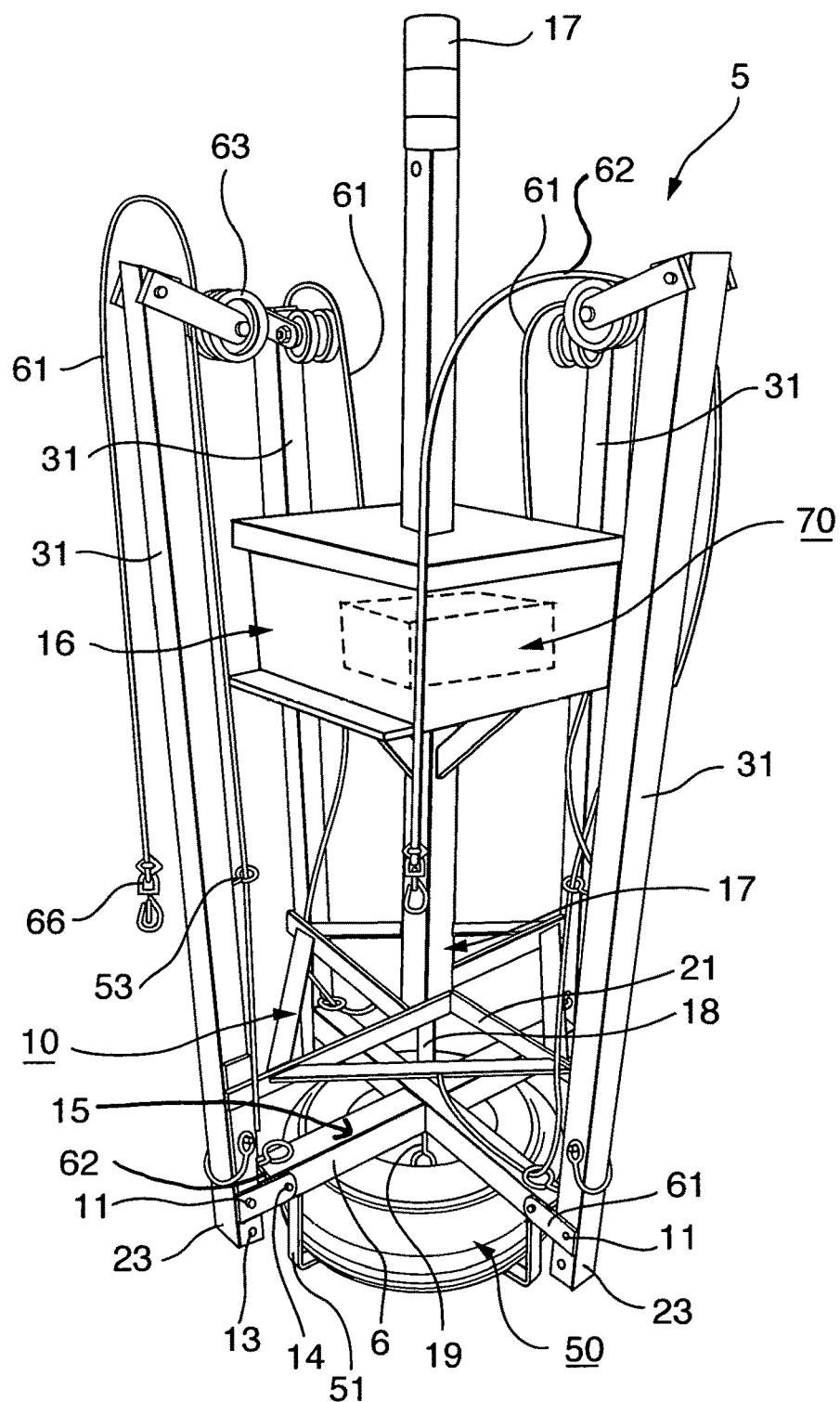
FIG. 1 is an oblique view of a prior art duck decoy frame in its collapsed state.
Figure 2:
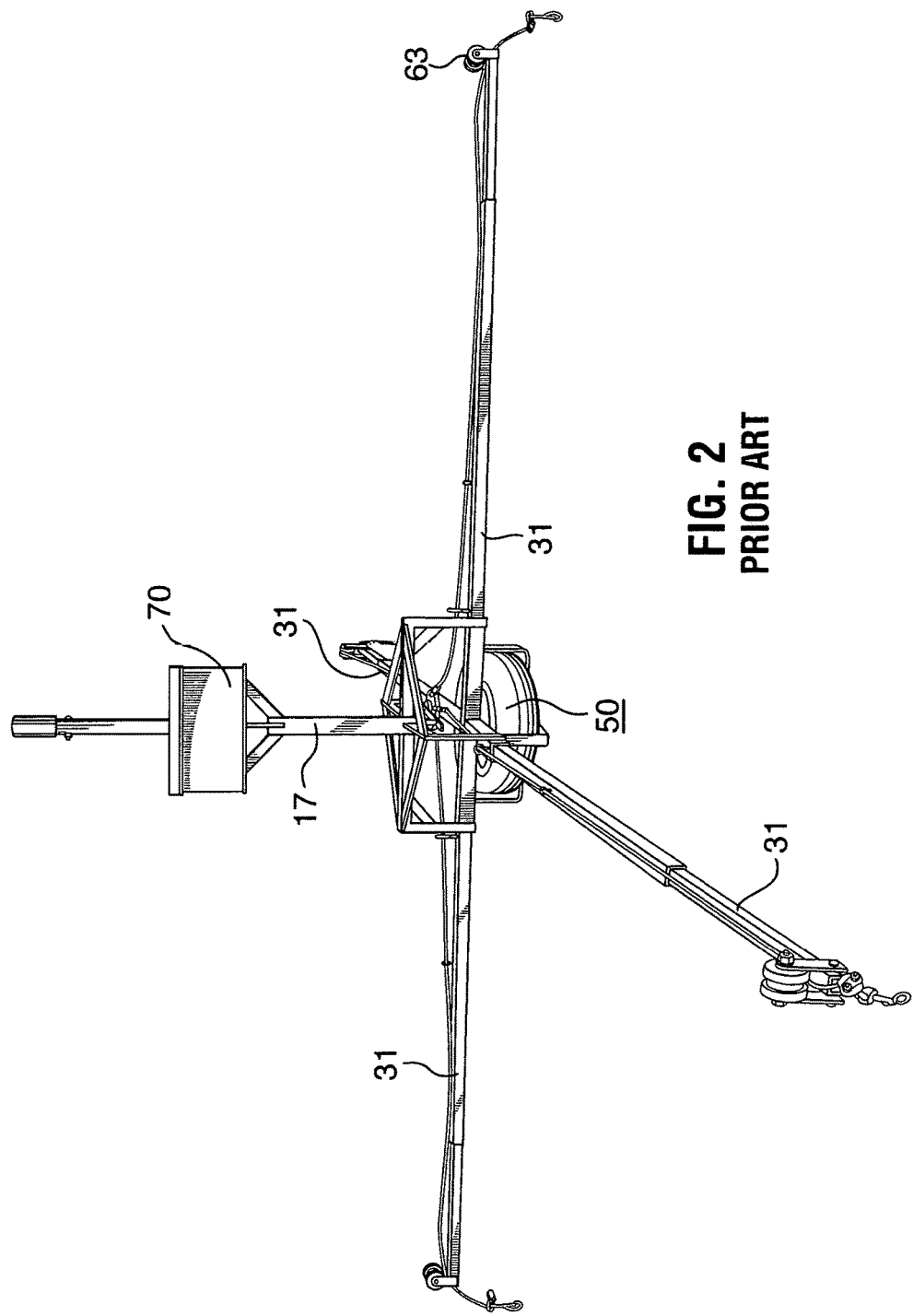
FIG. 2 is an oblique view of the prior art frame in an opened operative state but on dry land.
Figure 3:
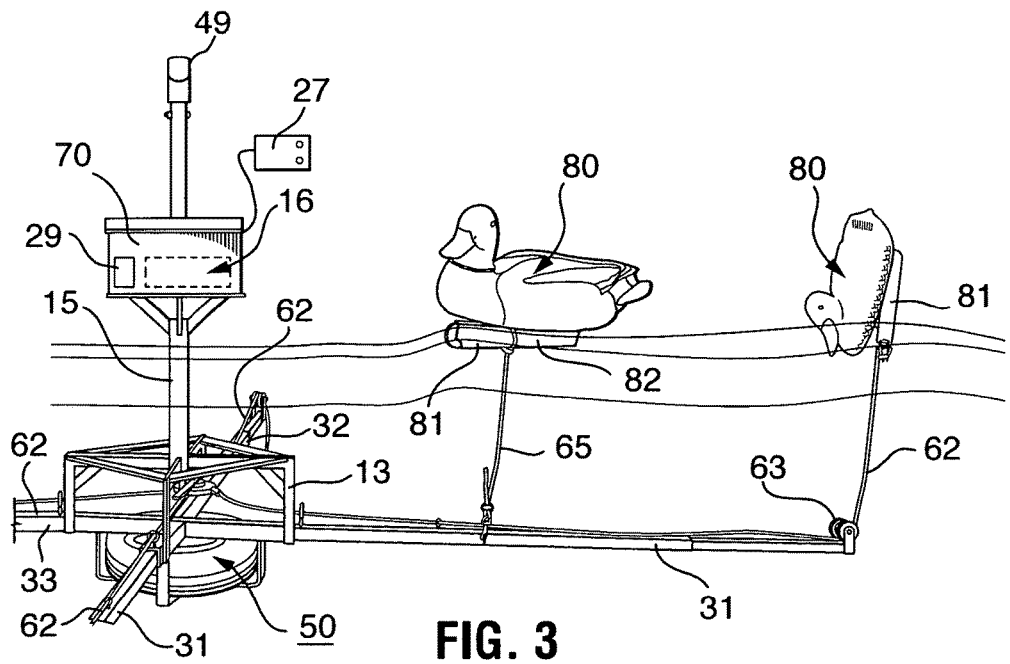
FIG. 3 is an oblique view, on a larger scale, of part of the lower portion of the prior art frame showing the arms radiating outwardly and a few game bird shaped decoy bodies to tether lines attached to the frame.
Figure 4:
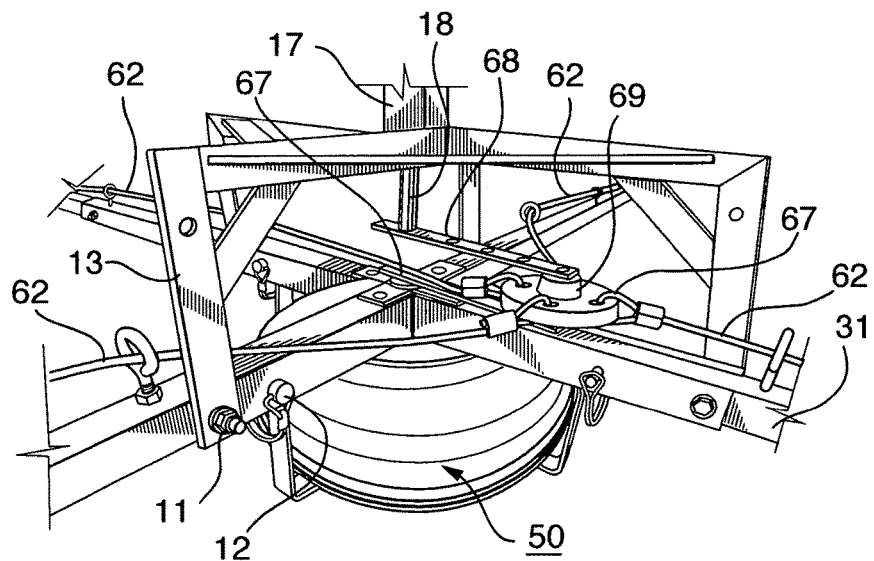
FIG. 4 is a partial view of a lower end portion of the prior art decoy supporting frame.
Figure 5:
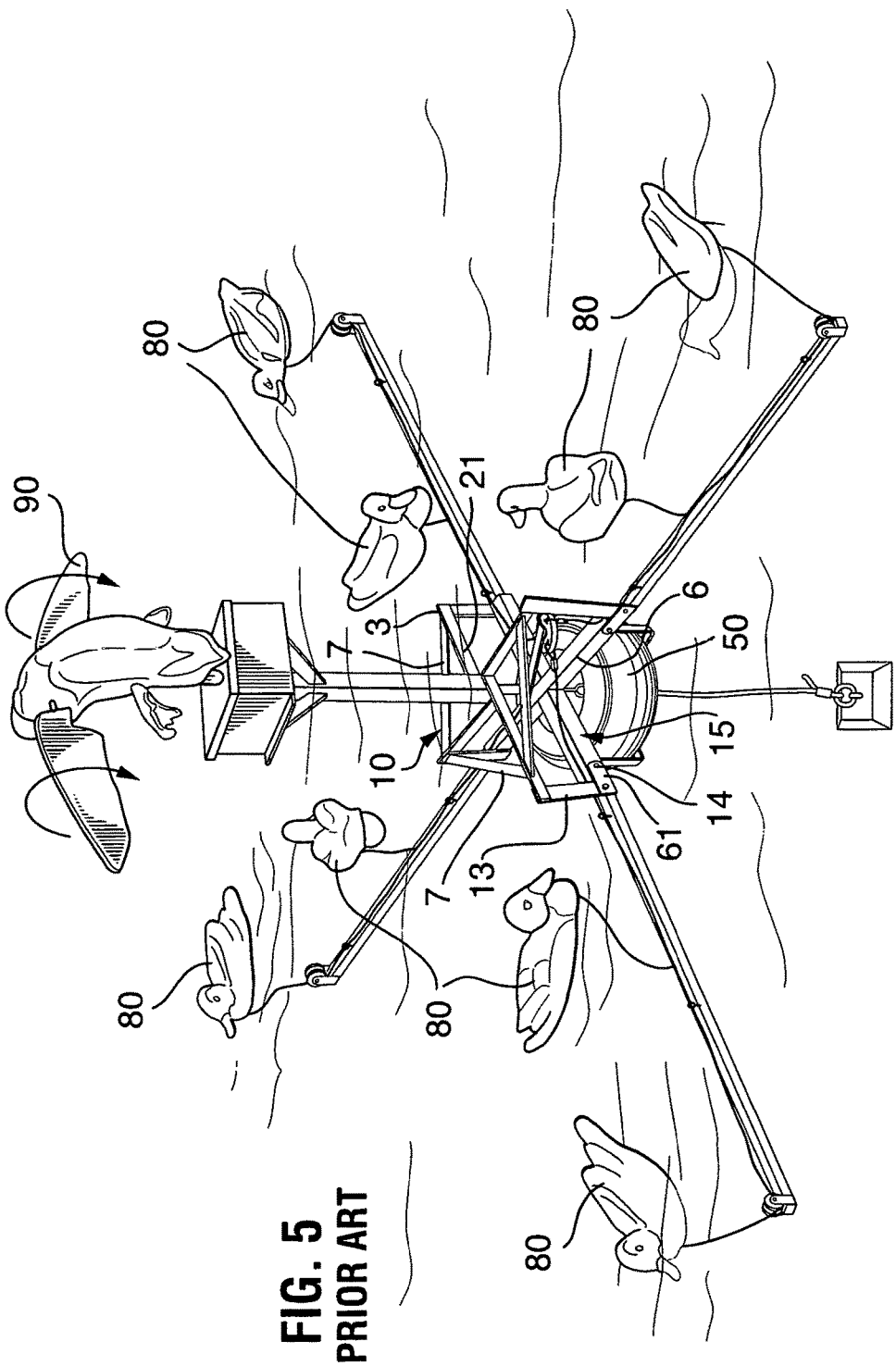
FIG. 5 is and oblique view showing the prior art decoy in its environment use floating in a body of water.
Figure 6:
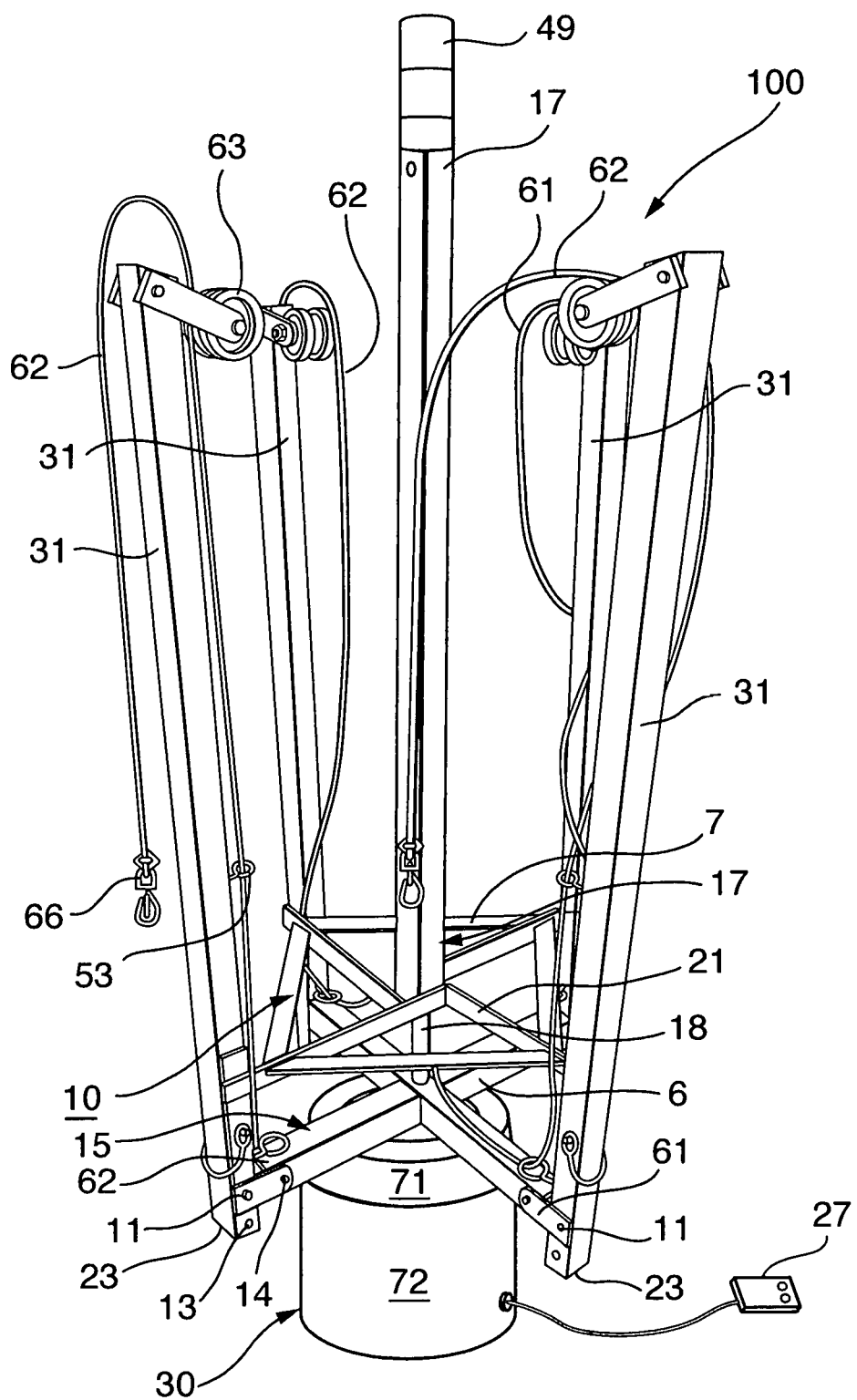
FIG. 6 is an perspective view of the duck decoy apparatus with the submersible canister and motor drive unit showing the arms folded in a collapsed state for folding or transport.

As shown in the drawings 1-5, a decoy apparatus supports a plurality of game bird simulating bodies such as duck decoys that float movably attached to a frame 10. The game bird attached thereto such as geese or ducks are pivotally connected to means for dunking the floating decoys or a front portion thereof to simulate feeding.

More particularly, the decoy apparatus 5 includes a tubular platform defining a central base 15 comprising angle iron or tubular cross members 6. A planar box frame 10 formed of short horizontal segments 7 is spaced apart from and aligned with the central cross member base 15. The planar box frame 10 is supported above the base 15 by short longitudinal segments defining legs 13 extending from the top corners of the base 15 to the bottom corners of the planar box frame 10. The legs 13 extend downwardly from each corner of the planar box frame portion 10 and are reinforced by braces 21 extending from the corners 3 of the planar box frame 10 to a vertical center longitudinal member forming a mast 17 mounted at the intersection of the braces 21.

A pair of spaced apart and aligned segments or plates form a vertically oriented yoke 61 for pivotally attaching the distal ends 62 of the cross members 6 of the base 15 to a proximate distal end 23 of the of a plurality of longitudinal members defining four arms 31 comprising angle iron or tubular cross members radiating from the central base 15.

A vertically oriented yoke 61 is affixed to a distal end of the base cross member 6 with a fastening means such as a pin or bolt 14 and to the distal end 23 of an arm 31 at a point, at or near, the distal ends of the folding radial arms 31. The folding arms 31 can comprise a continuous longitudinal segment of a fixed length or comprise two or more sections disposed in telescopic relation or simply additional segments. Each folding arm 31 is pivotally attached to the yoke 3 of the cross member 15 by a pivot pin 11 and is moveable from one to the other of a first vertical decoy frame collapsed storage state a shown in FIG. 1 with the folding arms 31 pivoted to extend upward perpendicular with respect to the planar box frame 10 and base 15.

As shown in FIGS. 2-5 the folding arms 31 pivot downward form the stored transport position to an in-use position in the horizontal plane of the base 15 and radiate outward therefrom. A retaining means such as a clip or removable pin 12 locks a respective folding arm in its radiating outwardly position by passing the pin through corresponding alignable holes formed in the folding arms and base member 6 of the cross member base 15.

The central box frame 10 includes an opening there through having means such as a pipe or collar affixed thereto for supporting a centrally disposed rotatable shaft 18 there through.

The planar box frame 10 has a central hollow vertical tubular member defining a post or mast 17 comprising a pipe or a tube centrally mounted to the braces 21 of the planar box frame 10 by welding or other means of fixation. A cam means including a pitman cooperatively engages a shaft 18 coaxially held within the mast 17. The shaft 18 extends from a pitman motor 16 mounted into a control box 70 which includes a battery 29 in electrical communication with the motor 16. The and control box 70 extends upward from the planar frame 10 a selected distance to insure that the control box is not flooded or subjected to water when the decoy apparatus is deployed into water. A wire or electric cord extends from the control box and motor a hand held remote or control device used to activate the motor. Alternatively, a receiver 49 may be disposed in the control box for receiving an electronic signal, for instance, and infrared or radio signal from a battery powered hand held transmitter control device.

More particularly, the cam mechanism comprises a pitman 69 including disc, plate, or multi-arm like member having a central mounting bore with optional bearing and a plurality of tether line attachment apertures spaced opposing one another around the periphery of the pitman 69. The pitman 69 is pivotally attached between a pair of pitman arms 67, 68 by a pin or bolt that projects into a selected one of a series of apertures spaced apart from one another longitudinally along the pitman drive arms 67, 68. As shown best in FIG. 1-5, a top drive arm 68 having a hole in its proximate end is rotatably mounted to and radiates outwardly from the lower end of pitman shaft 18 that extends downwardly from the planar box frame 10 rotatably supported by the tubular post 17. A corresponding bottom drive arm 67 spaced apart from and in alignment with the top arm 68 includes a hole in the proximate end for rotatably mounting onto a short shaft, bolt, or spindle extending upwardly from the center of the cross member 15. The shaft 18 is supported within the post 17 by an end thrust friction reducing bearing or the like and is driven by a pitman motor drive system 16, for example such as a battery powered pitman gear motor attached to the motor shaft 18 which is connected to the pitman arms 67, 68 by bolts or screws. The pitman motor drive system is readily constructed by anyone skilled in the art and is therefore illustrated only by way of example by broken line in FIG. 1 and includes a battery 29 power source for the motor and control means such as remote control receiver with corresponding remote and/or manual power off and on switches.

The prior art embodiment shown in FIGS. 1-5, utilizes a frame floatation device 50 is retained on the lower end or bottom of the cross member 15 by, for example, a plurality of (four) 'L' shaped brackets 51. The brackets have one leg 52 thereof spaced apart from a selected distance and attached to the cross member frame 17 which projects downwardly therefrom curving, bending or otherwise angled inwardly toward the center of the cross member and extending under the flotation device 50. The flotation device 50 is an expandable inflatable air bag, in the form of a tire inner tube, which inherently provides means for varying its buoyancy simply by varying the inflation pressure and hence its volume. It is contemplated that one or more blocks of STYROFOAM or similar material could be utilized in the flotation device as well. The lower end of the cross member frame 17 has a holding means such as an eye bolt 19 secured thereto at the frames axis of weight symmetry, for use in connecting an anchor line to the frame and an anchoring means such as a stake or heavy object such as an anchor should it be needed and/or desired to retain the decoy apparatus 5 in a predetermined floating location in a body of water to prevent drift from wind or waves.

An operative decoy includes at least two opposing decoys and preferably a plurality of decoys such as for example duck shaped bodies 80 capable of floating in a body of water and tethered to the cross member frame 15 by a tether line system 60. The locomotion system includes tether lines 62 associated with respective folding arm 31 wherein each one supports at least one tether line attached to the pitman and extending thorough at least one tether guide means such as an eyelet 53 over a pulley and to the distal end of the arm. It is anticipated that the tether lines 62 could be disposed within and threaded through tubular arms 31 as a means for guiding as an alternative to using guide means 53. Each tether has a connector 66 (snap fastener) attached to the free outer end thereof and operative for detachable connection to a decoy body associated therewith. In addition, a medial attachment means can be disposed on selected arms at selected locations for attaching a medial positioned decoy thereto by a sub-line 65 which can be attached by attachment means such as eyelets affixed to the arms 31 to attach to decoys 80 which do not pivot or "dunk" and are not connected to the tether or cam, but do float on the water and appear to be swimming due to rotation of the arms 31 in the water. Known decoy bodies are readily available that can be attached or readily modified for attachment for example by mounting thereon a receptive connector piece 81 such as a base or keel plate attached to the bottom of a decoy.

The tether line connects to the lower body portion of the fowl shaped body at a position located below the water surface during usage of the decoy. Connection to the fowl shaped bodies at the outer end of the arms is located at a position near a frontal end portion of the fowl shaped body so that when the tether line thereto is pulled the head of the foul gets pulled toward or under the surface of the water. Simultaneously with that movement the tail rises upwardly thereby simulating a fowl catching food below the surface. On the bottom of the body there is a keel 81 having multiple attachment points such as clips or spaced apart holes therein to which the tether line can be connected in a selected hole which serves to establish a pivot point which determines the motion of the decoy.

Each tether lines 62 has the proximate end thereof, opposite to the decoy connectable end, connected to the tether line anchor piece 67. The tether lines pass through guides 53 on the frame arms 31, for example eye-bolts secured to the frame and located at suitable locations, as well as a friction reducing guide, such as pulley 63, located near the free outer end on a respective one of folding arms 31. The shaft 18 can be rotated, oscillated, or driven intermittently about its longitudinal axis by the drive system rotating the pitman arms in a circle and thereby causing the tether lines to shorten and pull or lengthen and release tension on the floating fowl shaped bodies. Flotation characteristics of the fowl shaped bodies, placement of the tether line connections thereto and degree of movement of the tether lines determines the movement of the fowl shaped bodies as they float in the water.

In preparation for use as a decoy the folding arms 31 can be pivoted to their operative state shown in 2-5, for example, radiating outwardly from the lower end of the planar box frame 10 and locked in that position. Decoy duck shaped bodies 80, capable of floating, are attached to the outer free end of the tether lines as well any subtether lines. Attachment of a tether line to a front portion of the decoy support 81 pulls the front portion of the decoy downward into the water resulting in a dunking action demonstrated by the decoy upon the pitman extending in the opposite direction of the decoy and simultaneously relaxing tension on the opposing tether line resulting in extension of the line to the decoy with the result that the decoy's hear rises. Thus, opposing tether lines work in a synchronized motion to pull a decoy's head down on one side of the pitman and release the decoy's head to raise up on the opposite side of the pitman.

In the prior art embodiment shown in FIGS. 1-5, the flotation of the frame is such, or adjusted if necessary to be such, that the folding arms, tether lines, tether line anchor means and controllable floatation means will be submersed in the body of water. During usage the floating fowl shaped bodies anchored to the frame assist in stabilizing the frame as it floats in a body of water. Additional decoys can be suspended from lines positioned at selected points along the extendable folding arms providing an additional attraction and supplemental float means.

As an option, as shown in the figures, the post or mast 17 extends from the planar box frame 10 to support the control box and motor assembly 16 can be extended vertically to support an additional decoy 90. A fowl shaped body can be mounted on the post of the type where the wings can move, or caused to be moved, to simulate for example a duck in flight. Decoys of this nature are known and by way of example reference maybe had to U.S. Pat. No. 6,092,323 granted Jul. 25, 2000 to C. M. McBride et al. for a "Duck Decoy" having motorized wings which provide the decoy with the appearance of a duck in perpetual stationary flight above a water body and which is incorporated by reference herein. The decoy 90 may be independently controlled and powered or in electrical communication with the control box 70.

DETAILED DESCRIPTION OF THE PREFERRED EMBODIMENT

The present improved submersible decoy apparatus 100 is shown in FIGS. 6-10 and designed for the motor housing extending from the frame base to rest on the bottom surface submerged in a body of water supporting the central portion of the frame with the arms extending outward therefrom either resting on the bottom or suspended outwardly from the frame base and submerged in the water. Only the decoys float on the surface. A remote control cable may extend from the submerged motor to a hand held unit of a user; or a receiver may be mounted onto an optional central decoy support member or mast which extends out of the water or is telescoping and extendable out of the water, wherein a remote control unit can be used to send a signal to the receiver in electrical communication with the motor to control the motor providing power to turn the cam and rotate the arms and decoys and pivoting of the decoys.

More particularly, the decoy apparatus 100 includes a tubular platform defining a cross member base or central base 15 comprising angle iron or tubular cross members 6. A planar box frame 10 formed of short horizontal segments 7 is spaced apart from and aligned with the central cross member base 15. The planar box frame 10 is supported above the base 15 by short longitudinal segments defining legs 13 extending from the top corners of the base 15 to the bottom corners of the planar box frame 10. The legs 13 extend downwardly from each corner of the planar box frame portion 10 and are reinforced by braces 21 extending from the corners 3 of the planar box frame 10 to a vertical center longitudinal member forming a mast 17 mounted at the intersection of the braces 21.

A pair of spaced apart and aligned segments or plates form a vertically oriented yoke 61 for pivotally attaching the distal ends 62 of the cross members 6 of the base 15 to a proximate distal end 23 of the of a plurality of longitudinal members defining four arms 31 comprising angle iron or tubular cross members radiating from the central base 15.

A vertically oriented yoke 61 is affixed to a distal end of the base cross member 6 with a fastening means such as a pin or bolt 14 and to the distal end 23 of an arm 31 at a point, at or near, the distal ends of the folding radial arms 31. The folding arms 31 can comprise a continuous longitudinal segment of a fixed length or comprise two or more sections disposed in telescopic relation or simply additional segments. Each folding arm 31 is pivotally attached to the yoke 3 of the cross member 15 by a pivot pin 11 and is moveable from one to the other of a first vertical decoy frame collapsed storage state a shown in FIG. 1 with the folding arms 31 pivoted to extend upward perpendicular with respect to the planar box frame 10 and base 15.

As shown in FIGS. 7-10, the folding arms 31 pivot downward form the stored transport position to an in-use position in the horizontal plane of the base 15 and radiate outward therefrom.

A retaining means such as a clip or removable pin 12 locks a respective folding arm in its radiating outwardly position by passing the pin through corresponding alignable holes formed in the folding arms and base member 6 of the cross member base 15.

The cross member base 15 includes an opening there through having means such as a pipe or collar affixed thereto for supporting a centrally disposed rotatable shaft 18 there through connectable to a cam assembly including a pitman 69. The shaft 18 may terminate after cooperatively engaging the pitman 69.

It is contemplated that the planar box frame 10 may also include an opening there through having means such as a pipe or collar affixed thereto for supporting a centrally disposed rotatable shaft 18 there through to connect to a decoy supported on a mast 17 mounted on the top of the planar box frame 10.

A canister 30 which contains and supports a motor drive unit 16 is fixedly connected to the cross member base 15 by to bolts or rod members 70. The canister 30 includes a bottom portion 72 and a top portion 71 which are detachable from one another and form a water tight unit when reattached. The canister members preferably contain female and male threaded portions respectively which are screwed together to form a water tight unit 30. A primary drive shaft 18 extends vertically through the top center of the top portion of the canister 30, and upwards through the center of the intersection of cross member base 15. The proximal ends 67, 68 of the horizontal primary pitman arm is attached to the top end of the primary shaft 18. The pitman 69 is rotatably connected to the distal end of the primary pitman arms 67, 68. The waterproof canister base 30 includes electrical controls, switches, and a battery 29 in electrical communication with the motor 16. A cam means including a pitman 69 cooperatively engages the shaft 18 extending upward from the motor 16 through the cross member base 15. The cannister base 30 is attached to the underside of the cross member base by bolts 70 a selected distance and is to be completely submerged in the water when the decoy apparatus is deployed into water. A wire or electric cord extends from the cannister 30 and motor 16. A hand held remote or control device used to activate the motor 16. Alternatively, a receiver 49 may be disposed in the control box for receiving an electronic signal, for instance, and infrared or radio signal from a battery 29 powered hand held transmitter control device 27.

More particularly, the cam mechanism comprises a pitman 69 including disc, plate, or multi-arm like member having a central mounting bore with optional bearing and a plurality of tether line attachment apertures spaced opposing one another around the periphery of the pitman 69. The pitman 69 is pivotally attached between a pair of pitman arms 67, 68 by a pin or bolt that projects into a selected one of a series of apertures spaced apart from one another longitudinally along the pitman drive arms 67, 68. As shown best in FIG. 6-10, a top drive arm 68 having a hole in its proximate end is rotatably mounted to and radiates outwardly from the lower end of pitman shaft 18 that extends upward from the cross member base 15. A corresponding bottom drive arm 67 spaced apart from and in alignment with the top arm 68 includes a hole in the proximate end for rotatably mounting onto a short shaft, bolt, or spindle extending upwardly from the center of the cross member 15. The shaft 18 is supported with end thrust friction reducing bearing or the like and is driven by a pitman motor drive system 16, for example such as a battery powered pitman gear motor attached to the motor shaft 18 which is connected to the pitman arms 67, 68 by bolts or screws. The pitman motor drive system is readily constructed by anyone skilled in the art and is therefore illustrated only by way of example by the cutaway view in FIG. 1 and includes a battery 29 power source for the motor 16 and control means such as remote control receiver 49 with corresponding remote 27 and/or manual power off and on switches.

The decoy apparatus shown in FIGS. 6-10 includes a watertight submersible canister 30 to contain the motor 16, battery 29, wiring for electrical communication with and control with the motor and remote control or switch activation equipment. It is retained on the lower end or bottom of the cross member 15 by, for example, a plurality of bolts 70. The canister 30 may comprise one or more pieces and often is formed of a top section 71 and bottom section 72 threadably connected and may include an o-ring or other elasmeric seal 73 if necessary to maintain a water tight seal.

An operative decoy includes at least two opposing decoys and preferably a plurality of decoys such as for example duck shaped bodies 80 capable of floating in a body of water and tethered to the cross member frame 15 by a tether line system 60. The locomotion system includes tether lines 62 associated with respective folding arm 31 wherein each one supports at least one tether line attached to the pitman and extending thorough at least one eyelet 53 over a pulley and to the distal end of the arm. Each tether has a connector 66 (snap fastener) attached to the free outer end thereof and operative for detachable connection to a decoy body associated therewith. In addition, sub-lines 65 can be attached to attachment means such as eyelets affixed to the arms 31 at selected positions along the arm 31 and at selected lengths to attach to decoys 80 which do not pivot or "dunk" and are not connected to the tether or cam, but do float on the water and appear to be swimming due to rotation of the arms 31 in the water. Known decoy bodies are readily available that can be attached or readily modified for attachment for example by mounting thereon a receptive connector piece 81 such as a base or keel plate attached to the bottom of a decoy.

The tether line connects to the lower body portion of the fowl shaped body at a position located below the water surface during usage of the decoy. Connection to the fowl shaped bodies at the outer end of the arms is located at a position near a frontal end portion of the fowl shaped body so that when the tether line thereto is pulled the head of the foul gets pulled toward or under the surface of the water. Simultaneously with that movement the tail rises upwardly thereby simulating a fowl catching food below the surface. On the bottom of the body there is a keel 81 having multiple attachment points such as clips or spaced apart holes therein to which the tether line can be connected in a selected hole which serves to establish a pivot point which determines the motion of the decoy.

Each tether lines 62 has the proximate end thereof, opposite to the decoy connectable end, connected to the tether line anchor piece 67. The tether lines pass through guides 53 on the frame arms 31, for example eye-bolts secured to the frame and located at suitable locations, as well as a friction reducing guide, such as pulley 63, located near the free outer end on a respective one of folding arms 31. The shaft 18 can be rotated, oscillated, or driven intermittently about its longitudinal axis by the drive system rotating the pitman arms in a circle and thereby causing the tether lines to shorten and pull or lengthen and release tension on the floating fowl shaped bodies. Flotation characteristics of the fowl shaped bodies, placement of the tether line connections thereto and degree of movement of the tether lines determines the movement of the fowl shaped bodies as they float in the water.

In preparation for use as a decoy the folding arms 31 can be pivoted to their operative state shown in 2-5, for example, radiating outwardly from the lower end of the planar box frame 10 and locked in that position. Decoy duck shaped bodies 80, capable of floating, are attached to the outer free end of the tether lines as well any subtether lines. Attachment of a tether line to a front portion of the decoy support 81 pulls the front portion of the decoy downward into the water resulting in a dunking action demonstrated by the decoy upon the pitman extending in the opposite direction of the decoy and simultaneously relaxing tension on the opposing tether line resulting in extension of the line to the decoy with the result that the decoy's head pivots upward. Thus, opposing tether lines work in a synchronized motion to pull a decoy's head down on one side of the pitman and release the decoy's head to raise up on the opposite side of the pitman.

As an option, as shown in the figures, the post or mast 17 extends from the planar box frame 10 to support the control box and motor assembly 16 can be extended vertically to support an additional decoy 90. A fowl shaped body can be mounted on the post of the type where the wings can move, or caused to be moved, to simulate for example a duck in flight. Decoys of this nature are known and by way of example reference maybe had to U.S. Pat. No. 6,092,323 granted Jul. 25, 2000 to C. M. McBride et al. for a "Duck Decoy" having motorized wings which provide the decoy with the appearance of a duck in perpetual stationary flight above a water body and which is incorporated by reference herein. The decoy 90 may be independently controlled and powered or in electrical communication with the cannister motor 16 and battery 29.

The tether line anchor of the decoy frame moves in a closed loop path extending from the decoys along the arms to the cam. The tether line attaching decoys to a cam on the decoy frame which moves in a closed loop path extending from the decoys along the arms to the cam so that opposing decoys are in various positions of floating on the water, dunking with the decoy's head under water at a 90 degree angle with respect to the water surface, swimming due to rotation of the arms, and tipping whereby the head of the decoy is angled from 0 to 90 degrees with respect to the water depending upon the position of the cam.

The embodiment shown in FIGS. 6-10, is designed for motor housing sealed in the canister 30 extending from the frame cross member base 15 to rest on the bottom of a body of water supporting the cross member base 15 with the arms extending outward therefrom either resting on the bottom or suspended outwardly from the frame base and submerged in the water. Only the decoys float on the surface. A remote control cable may extend from the submerged motor to a hand held unit of a user; or a receiver may be mounted onto an optional central decoy support member or mast 17 which extends out of the water or is telescoping including multiples section 74 and 75.

Figure 7:
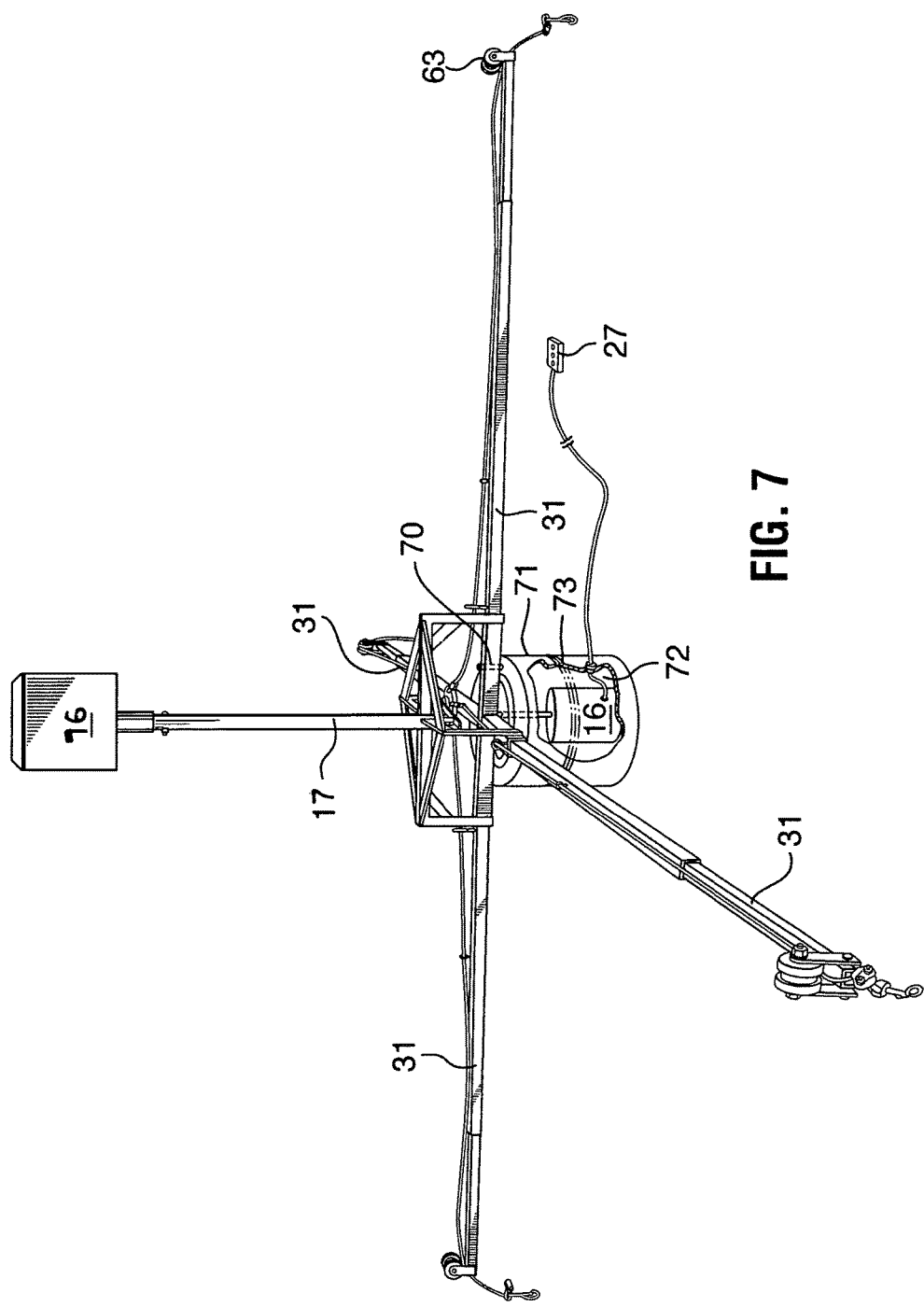
FIG. 7 is an oblique view of the frame in an opened operative state with the arms extended outward radially and a charging solar panel in electrical communication with the motor and battery in the submerged cannister.
Figure 8:
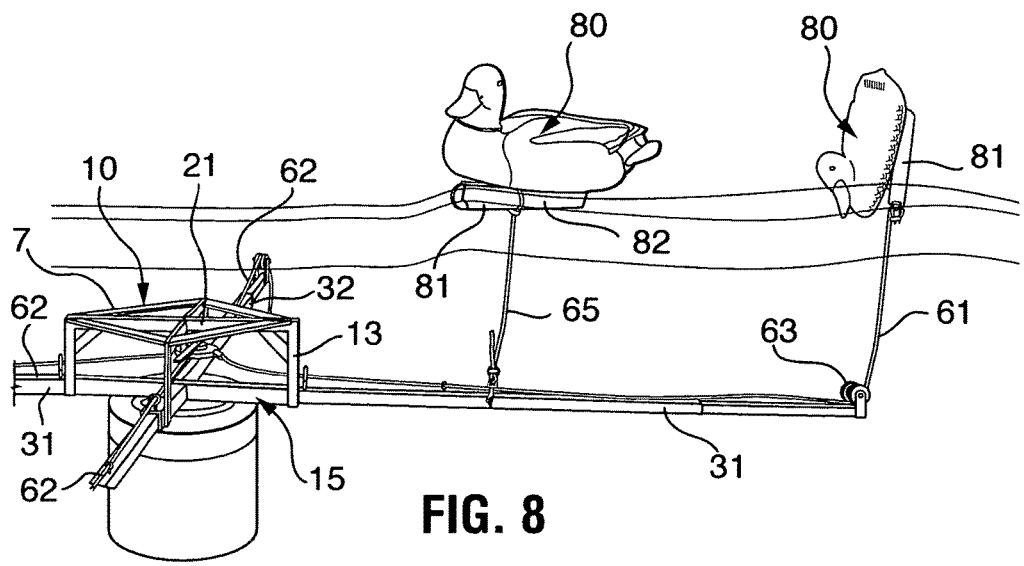
FIG. 8 is an oblique view of part of the submerged decoy apparatus showing the arms radiating outwardly from the base and a pair of duck decoys with an outer decoy attached to a tether line by the base frames at pivot point to force the duck to pivot downward as the cam lengthens and shortens the tether during rotation and with another decoy attached to the arm at an intermediate position so that the decoy floats and rotates "swims" floats in close proximity to the rotating "swimming" and dunking duck.
Figure 9:
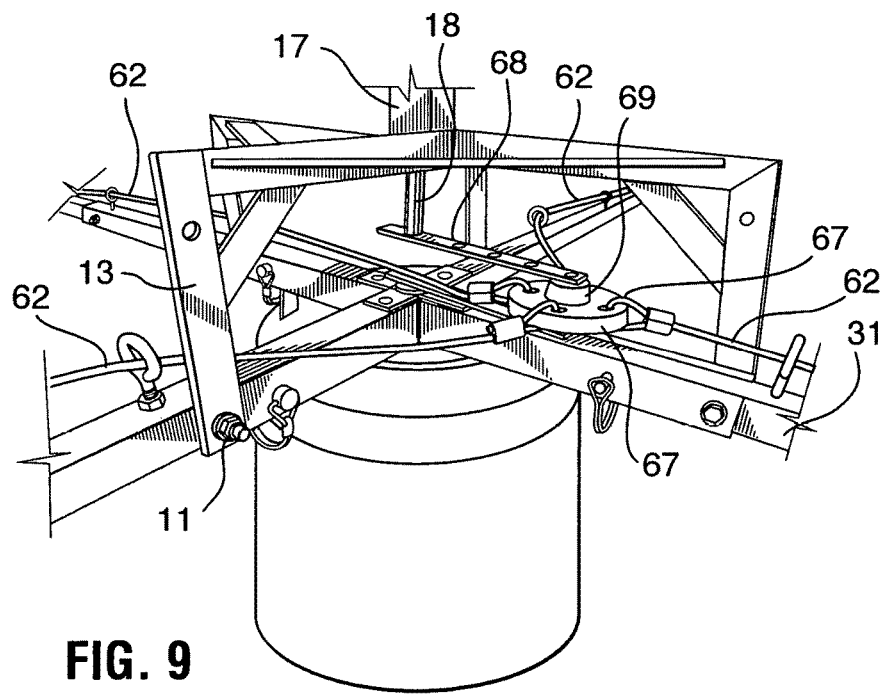
FIG. 9 is a partial view of a lower end portion of the decoy apparatus and the supporting frame showing the submersed motor and battery cannister.
Figure 10:
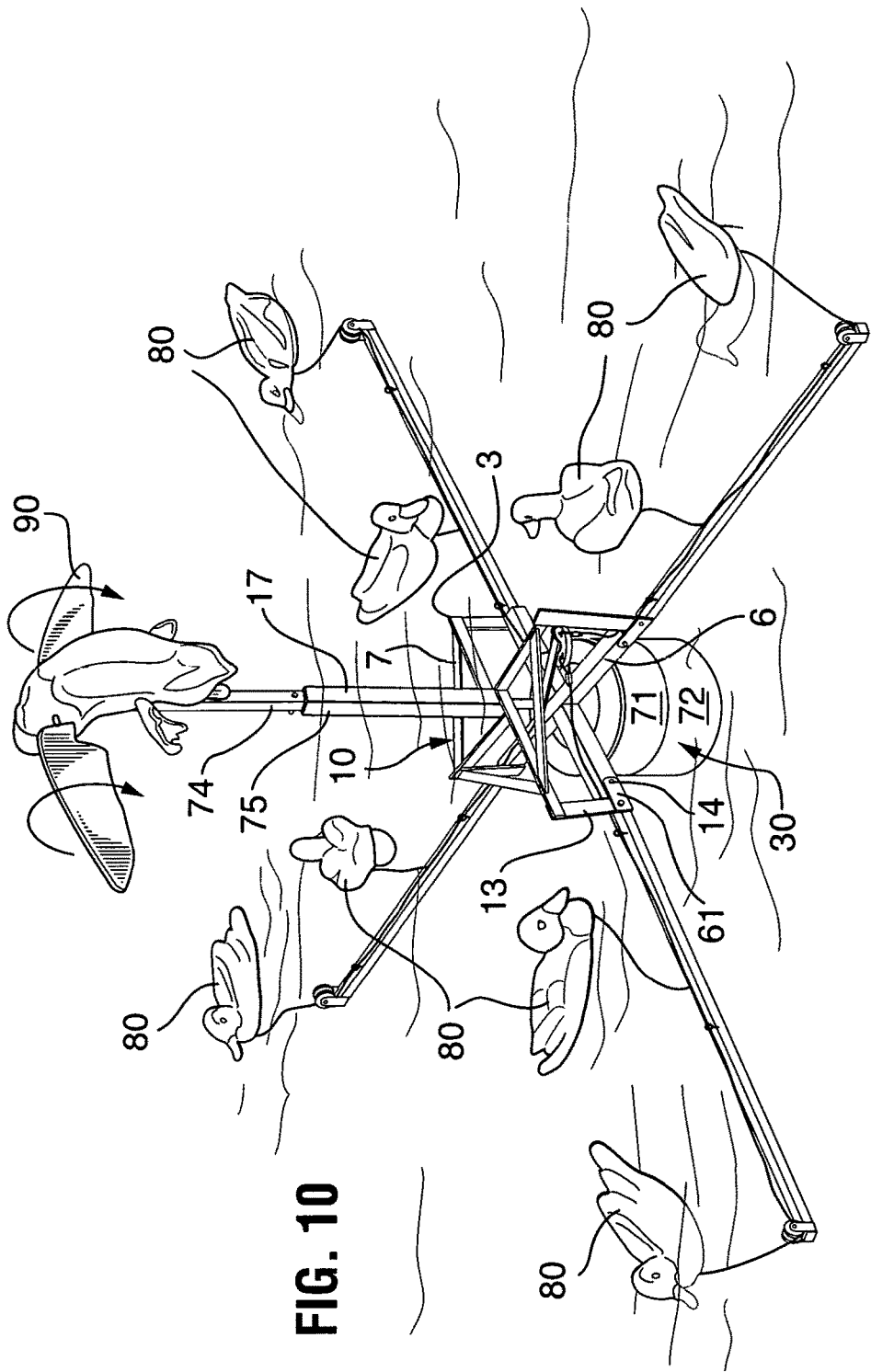
FIG. 10 is and oblique view showing the submergible decoy apparatus with an optional telescoping mast for supporting a decoy, and/or a solar cell, and/or a receiver in electrical communication with a transmitter control unit.

As shown in FIG. 7, a mast 17 may be employed to extend out of the water and hold a receiver and/or a solar panel 76 in electrical communication with the battery. A remote control unit can be used to send a signal to the receiver in electrical communication with the motor to control the motor providing power to turn the cam and rotate the arms and decoys and pivoting of the decoys.

Specific methods, or embodiments discussed are intended to be only illustrative of the invention disclosed by this specification. Variation on these methods, or embodiments are readily apparent to a person of skill in the art based upon the teachings of this specification and are therefore intended to be included as part of the inventions disclosed herein.

Reference to documents made in the specification is intended to result in such patents or literature cited are expressly incorporated herein by reference, including any patents or other literature references cited within such documents as if fully set forth in this specification.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

We claim:

1. A submersible decoy dunking apparatus, comprising:
   a frame extending below the surface of said body of water, said frame including at least two opposing arms extending outwardly from a base of said frame;
   a waterproof canister attaching to a bottom of said frame, said waterproof canister including an electric motor and a battery in electrical communication supported therein;
   a shaft extending from said motor upward through an opening in said frame cooperatively engaging a pitman arm mounting on said frame and rotatably connecting thereto;
   a pitman connecting to said pitman arm in rotational communication with said pitman arm and said motor;
   a tether line attaching to a selected attachment point of said pitman extending along each one of said at least two opposing arms extending from said frame;
   a tether line guide means extending from each one of said at least two arms;
   means movably mounting said tether line pitman on said frame for movement along a predetermined path;
   at least a floatable first decoy and a floatable second decoy attaching to a distal end of each opposing tether line; and
   said rotation of said pitman arm in a circulation motion creating in a cam action decreasing the length of said tether line causing at least a portion of said floatable first decoy to be submerged and simultaneously increasing the length of the opposing tether line causing at least a portion of said floatable second decoy to surface.

2. The submersible decoy dunking apparatus of claim 1 including a medial attachment means disposed on said at least two arm's at selected locations for attaching a medial positioned decoy thereto.

3. The submersible decoy dunking apparatus of claim 1, wherein said frame including a plurality of arms pivotally attaching thereto, said arms being movable from one to the other of a first decoy storage position wherein they extend upward above the frame and a second decoy operative position wherein said arms radiate outwardly in a horizontal plane from said frame.

4. The submersible decoy dunking apparatus of claim 3 including means for selectively operatively locking said arms in their second position.

5. The submersible decoy dunking apparatus as defined in claim 1 said arms are adjustably variable in length.

6. The submersible decoy dunking apparatus as defined in claim 1 wherein said pitman travels in a selected closed loop path.

7. The submersible decoy dunking apparatus of claim 1 including a powered movable decoy extending from a mast extending upward froth said flame.

8. The submersible decoy dunking apparatus of claim 1, said floatable decoy including an attachment point at a forward position, wherein rotation of said cam decreasing the length of said tether line creates a dunking motion of said floatable decoy.

9. The submersible decoy dunking apparatus of claim 1, wherein rotation of said shaft by said motor rotates said arms with respect to said frame.

10. The submersible decoy dunking apparatus of claim 9, including a mast extending above said frame for supporting a solar panel in electrical communication with said battery. wherein rotation of said shaft by said motor rotates said arms with respect to said frame.

11. A submersible decoy dunking apparatus, comprising:
a base frame extending below the surface of the water including at least two opposing arms extending outwardly therefrom below the surface of the water;
an electric motor supported beneath said base frame in a water tight canister including means for rotating said pitman with respect to said base frame for movement along a predetermined path beneath the surface of the water;
a tether line extending from said pitman along at least two opposing arms extending from said base frame;
means for guiding a tether line along said arms from said pitman to said decoy;
said pitman rotating with respect to said base frame for movement along a predetermined path; means connecting an end of said individual tether lines to said pitman;
a decoy attaching to a distal end of said tether line opposite said pitman at a selected position for pivoting said decoy capable of floating in a body of water;
whereby rotation of said pitman along said predetermined path shortens a tether line extending along a selected arm causing said decoy to pivot downward and simultaneously lengthens a tether line extending along said opposing arm releasing tension thereof and causing said decoy to pivot upward.

12. The submersible decoy dunking apparatus of claim 11, wherein said means for rotatably said pitman with respect to said base frame for movement along a predetermined path comprises at least one pitman arm extending from a shaft of said motor cooperatively engaging said pitman.

13. The submersible decoy dunking apparatus as defined in claim 11, said base frame including a plurality of arms pivotally attaching thereto, said arms being movable from one to the other of a first decoy storage position wherein they extend upward above said base frame and a second decoy operative position wherein said arms radiate outwardly in a horizontal plane with respect to said base frame.

14. The submersible decoy dunking apparatus of claim 11 wherein said arms are adjustably variable in length.

15. The submersible decoy dunking apparatus of claim 11 wherein rotation of said shaft by said motor rotates said arms with respect to said best frame.

16. The submersible decoy dunking apparatus of claim 11, including a mast extending above said base frame for supporting a solar panel in electrical communication with said battery.

17. The submersible decoy dunking apparatus of claim 11, wherein said pitman moves in a selected closed loop path.

18. The submersible decoy dunking apparatus of claim 11, including a powered movable decoy extending from said base frame in cooperative engagement with said motor.

19. The submersible decoy dunking apparatus of claim 11, wherein said arms are movable from one to the other of a first decoy vertical storage position extending along the base frame portion and a second decoy operative position radiating outwardly therefrom.

20. The submersible decoy dunking apparatus of claim 11, including an attachment point at a forward position, wherein rotation of said cam decreasing the length of said tether line creates a dunking motion of said floatable decoy.

\* \* \* \* \*